Feb. 28, 1939.                    T. DE PORT                    2,148,444
                      LAND SPEED MEASURING INSTRUMENT
                         Filed Feb. 6, 1937        3 Sheets-Sheet 1
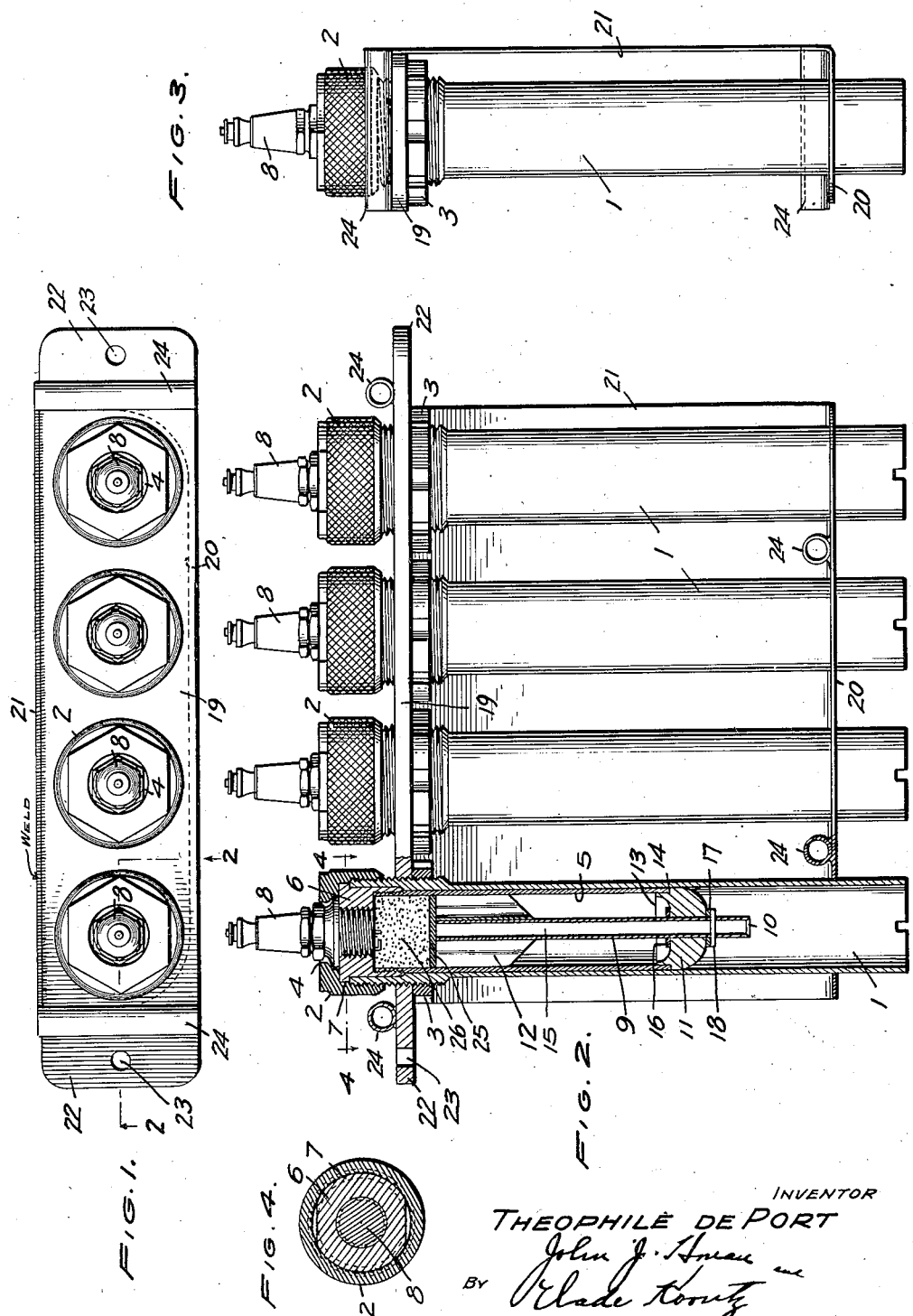
INVENTOR
THEOPHILE DE PORT
BY
ATTORNEYS Feb. 28, 1939.  T. DE PORT  2,148,444
LAND SPEED MEASURING INSTRUMENT
Filed Feb. 6, 1937   3 Sheets-Sheet 2
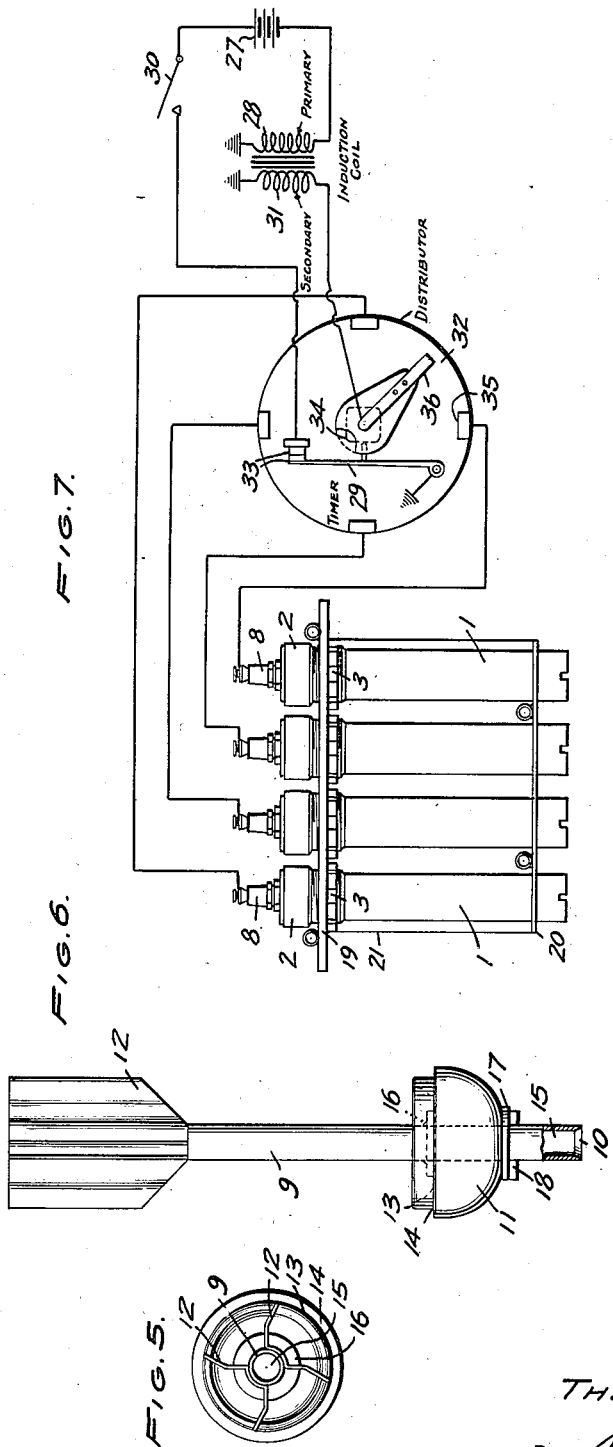
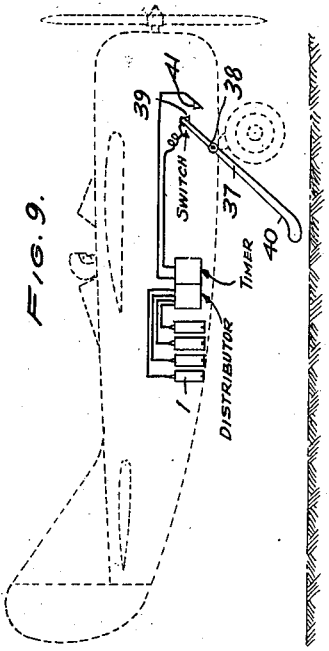
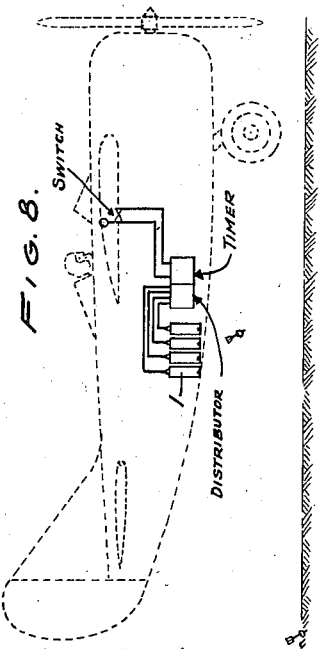
INVENTOR
THEOPHILE DE PORT
BY
ATTORNEYS Feb. 28, 1939.   T. DE PORT   2,148,444
LAND SPEED MEASURING INSTRUMENT
Filed Feb. 6, 1937   3 Sheets-Sheet 3
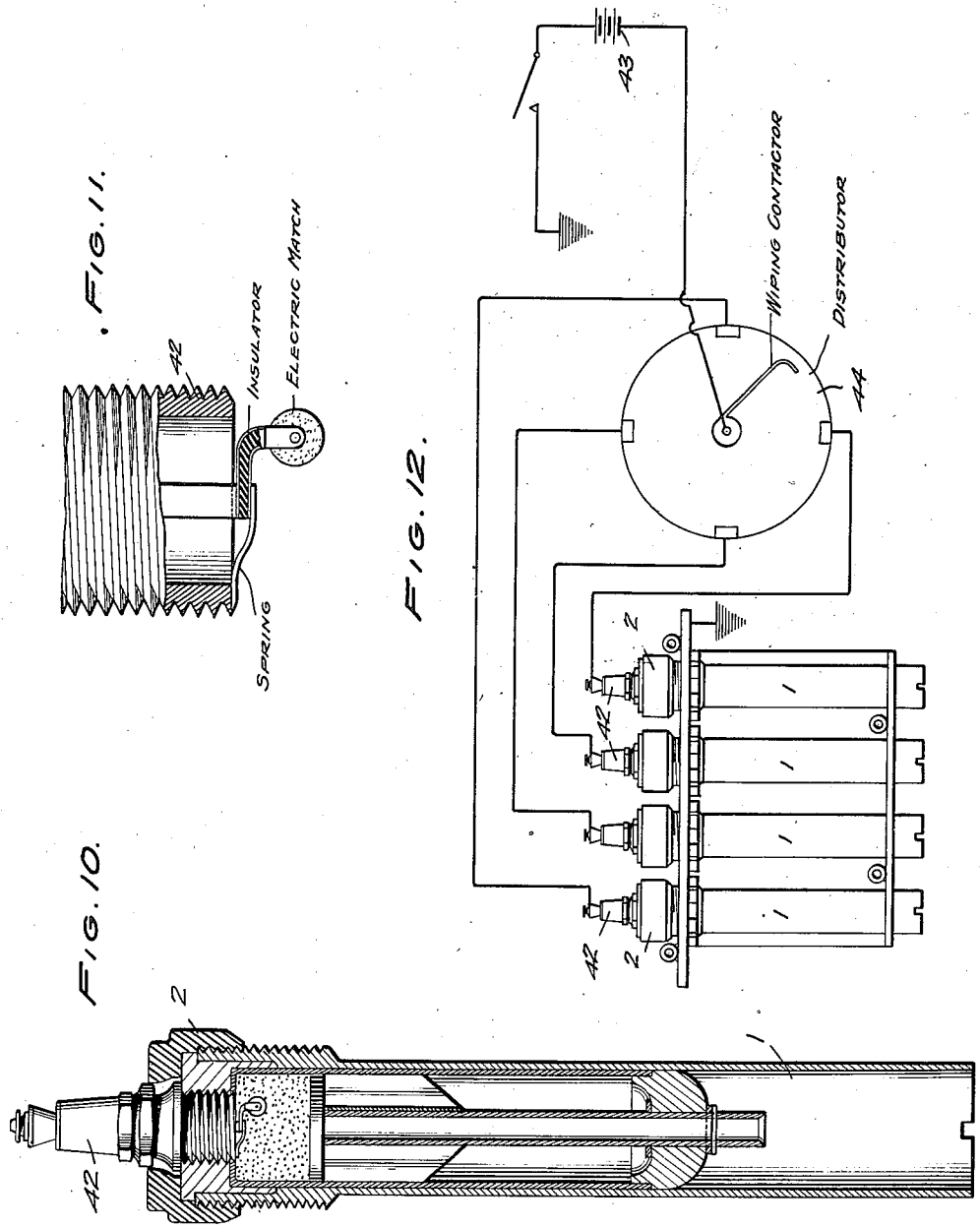
INVENTOR
THEOPHILE DE PORT
BY
ATTORNEYS Patented Feb. 28, 1939

2,148,444

UNITED STATES PATENT OFFICE 2,148,444

LAND SPEED MEASURING INSTRUMENT

Theophile de Port, New Carlisle, Ohio
Application February 6, 1937, Serial No. 124,462

14 Claims. (Cl. 244—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the art of ascertaining the speed of moving bodies and is directed to a novel method and an apparatus for fixing and indicating, at regularly timed intervals upon a surface passed over by a moving body, progressively spaced points corresponding to instantaneous locations of the moving body relative to the said surface in order that the distances between the several indicated points may be measured in ascertaining the average speed of the body between successive locations.

The invention is particularly useful in the field of aeronautics and is herein illustrated and described in connection with its application to an airplane for use in ascertaining the landing speed of the airplane. It is to be understood, however, that the invention is capable of wider application and is intended to be used wherever feasible in determining the speed of any moving body.

Briefly, the apparatus for practicing the method of the invention consists of a plurality of gun units suitably mounted on an airplane and successively and automatically fired by a timer mechanism for discharging specially shaped projectiles from the moving airplane into the ground at predetermined constant intervals; there being suitable means provided on the projectiles to facilitate locating same for measuring the distances between them.

In the accompanying drawings,

Figure 1 is a top view of the gun-and-rack assembly;

Figure 2 is a side view thereof, with one of the gun units in section;

Figure 3 is an end view of the assembly;

Figure 4 is a cross section on line 4—4 of Figure 2;

Figures 5 and 6 are top and side views, respectively, of the projectile;

Figure 7 is a diagrammatic view of the complete apparatus with a pilot-actuated circuit controlling master switch;

Figure 8 is a schematic showing of the device installed on an airplane, and

Figure 9 is a view similar to Fig. 8 but showing an automatic switch in replacement of the pilot-actuated switch.

Figures 10, 11 and 12 are sectional, detail and schematic views, respectively of an alternate form of the invention.

Any number of gun units may be employed as may be found necessary or desirable. Each gun unit is composed of an open ended metal tube 1 externally threaded at one end to receive the internally screw-thread knurled cap or breach 2 and the lock nut 3. The breech 2 has a central opening 4. Each gun is loaded with a cartridge consisting of a brass shell 5 having a snug fit in the bore of the gun and screwed at its upper end into a brass cap 6; the latter having a flange 7 which overlies the upper edge of the gun barrel and which is contacted by an internal shoulder of the breech so as to be clamped to the gun barrel when the breech is screwed down tight. The cartridge cap has a central screw threaded orifice in which is screwed a conventional spark plug 8 which projects outwardly through the central opening 4 of the gun breech. The projectile consists of a specially shaped dart having a tubular shaft 9 of aluminum alloy provided inwardly of an internally beveled extremity 10 with a head 11 and at its other end being provided with fins 12. The head is formed of a selected wood material, such as white pine or spruce, with an approximately hemispherical body from the flat faced side of which projects a reduced cupped portion with a circular rim 13 of an outside diameter to have a tight fit in the lower end of the cartridge shell. Rim 13 is spaced inwardly of the circular edge of the flat face of the head to provide a shoulder 14 for abutment with the lower edge of the cartridge shell. The head has a central bore 15 for insertion of the shaft therethrough and it is held in position on the shaft by and between two washers 16 and 17, the former being tack welded to the shaft and the latter being fastened thereto with a cotter 18. As illustrated in Figure 5, two thin plates, preferably of aluminum alloy, are employed to provide the fins 12. These plates are fastened to the shaft, by tack welding, at diametrically opposite points with longitudinal side portions bent angularly as shown to form fins. The head of the dart forms an abutment for contacting the ground to limit the depth to which the dart penetrates the ground and, together with the exposed position of the shaft and fin, provides visible means for conveniently locating the dart.

The gun units, in vertical position, are supported in a metal rack composed of horizontal upper and lower shelf-like flanges 19 and 20 at opposite edges of a thin plate body 21. The top flange 19 has longitudinally spaced screw threaded holes into which the upper ends of the gun barrels are screwed and the bottom flange 20 has corresponding non-threaded openings for receiving the depending lower portions of the gun barrels. The gun barrels are locked at their screw connections with the top flange by means of the lock nuts 3. The body 21 and the bottom flange 20 may consist of a single sheet of material but the top flange 19 is preferably of separate stock of considerably greater cross section than the body 21 and bottom flange 20 and of greater length than the bottom flange so as to extend appreciably beyond the vertical side edges of the body, as indicated at 22, for convenient attachment to a support; the extensions 22 having aperture 33 through which they may be bolted or otherwise fastened to the support. In addition, each flange is provided on its upper surface with a pair of short open ended metal tubes 24 which are welded to the flanges. The top flange is also secured, by welding to the upper edge of the rack body 21.

The gun barrels are of greater length than the cartridges and projectiles and the projectile is held in the cartridge casing by friction with a wadding 25 and an explosive charge 26 at its inner end. The explosive charge may be ignited in various ways and means for accomplishing this electrically is illustrated in Figure 7 which illustrates an arrangement of electrical circuits such as are generally employed in a conventional battery ignition system. The primary circuit consists of a battery 27, primary winding 28 of an induction coil, contact breaker or timer mechanism 29 and master switch 30. The secondary circuit includes the secondary winding 31, distributor 32 and spark plug 8. As is well understood in the art, the mutual induction in the secondary winding on the interruption of the primary circuit, when the contacts 33 of the timer mechanism are opened by the mechanically operated timer cam 34, results in a high-induced E. M. F. which is sufficient to produce, through the distributor circuit, a spark at the gap of the spark plug corresponding to the particular distributor segment 35 with which the distributor arm or brush 36 is at such time in contact. The timer cam 34 and the insulated distributor arm 36 are mounted on a common shaft for rotation at uniform speed so that the primary circuit will be opened and closed at predetermined intervals for successive firing of the gun units. The means (not shown) for imparting rotation to the arm and cam of the distributor-timer mechanism may be a constant-speed spring-wound motor or a constant speed electric motor with proper gearing and a known rotational velocity.

In practice, the device is suitably installed crosswise in an airplane fuselage with the muzzles of the guns directed downwardly so that the darts are shot into the ground and the timing mechanism is set in operation just before the airplane (the landing speed of which is to be measured) is nosed down for a landing. At the instant when the speed of the airplane in level flight over the ground is desired to be known, the pilot closes the switch 30 of the primary circuit so that the darts or markers successively discharged into the ground from the gun barrels indicate on the ground passed over by the airplane instantaneous locations of the latter at the time of the discharges. By knowing the interval between successive firing of the gun barrels and the measured distance between discharged markers on the ground, the average speed at which the airplane was traveling between the successive shots can be accurately determined.

The embodiment of the invention illustrated in Figure 9 differs from the previously described structure merely in the substitution of an automatic switch for the pilot-operated switch 30. This automatic switch consists of an elongated bar or lever 37 fulcrumed at 38 to provide a short upper arm and a long lower arm. The upper arm of the lever, which is of insulating material, carries a contact point 39 which is electrically connected with one end of the primary circuit and the lower arm of the lever is made heavy or weighted at its lower end 40 to normally position the lever with the contact point 39 spaced from a stationary contact point 41, which is electrically connected with the other end of the primary circuit. The lever is preferably installed in the airplane at a point rearwardly adjacent the landing gear so that in the normal position of the lever, the lower end of the same extends downwardly below the landing wheels. Hence, when the airplane is close to the ground in making a landing the lower end of the lever contacts the ground before the landing wheels are grounded and is turned about its axis to engage contacts 39 and 41 at the instant the landing wheels are grounded; the engagement of the contacts closing the primary circuit and causing a marker to be discharged from a gun barrel at the instant of landing and at intervals while the airplane is rolling along the ground.

The modification disclosed in Figures 10 to 12, inclusive, corresponds to the previously described device except that the conventional spark plug 8 is replaced by an electric match-detonator 42 which does not require a booster such as shown in Figure 7, for igniting the same. The current passes directly from the source 43 to the distributor 44 and thence to the selected electric match detonator which may be of any well known and conventional construction.

Having thus described the invention, I claim:

1. A device for use in ascertaining the speed of a moving body comprising downwardly directed projectile-discharging means carried by the body and armed with dart shaped projectiles to be successively discharged into the ground at predetermined intervals while the body is in motion, means provided on said projectiles in order to locate same on the ground for measuring the distances between them, and means for actuating the projectile-discharging means to discharge the projectiles successively and at predetermined constant intervals.

2. A device for use in ascertaining the speed of a moving body relative to the ground passed over comprising a plurality of guns mounted on said body and directed groundward, a charge in each gun consisting of an explosive and an arrow-like projectile, an electrical firing circuit including a distributor and a timer for causing said guns to be fired consecutively and at known constant intervening intervals to cause the projectiles to be discharged into the ground to indicate thereon instantaneous locations of the moving body at the times of the discharges.

3. A device for use in ascertaining the landing speed of an airplane which consists of a plurality of guns mounted on the airplane and directed downwardly for discharging into the ground, a charge in each gun consisting of an explosive and a dart type projectile, means for firing said guns to cause said projectiles to be shot into the ground successively and at predetermined intervening intervals while the airplane is in motion to indicate on the ground instantaneous locations of the airplane at the times of the discharges, said means consisting of an electric ignition circuit of the jump spark type and a normally opened circuit closer having an operating arm depending from the airplane for contact with the ground before the landing gear of the airplane is grounded when making a landing, said arm being responsive to such contact for closing the ignition circuit substantially at the instant the landing gear is grounded for causing a marker to be discharged at the instant of landing and at intervals while the airplane is rolling along the ground.

4. A device for establishing on the ground fixed points representing successive distances passed over by an airplane in known equal units of time for convenient measurement of such distances to ascertain the average speed of the airplane between successive points which comprises the combination with an airplane of a plurality of guns directed downwardly for discharging into the surface of the ground, a charge in each gun consisting of an explosive and a dart-shaped projectile having a slender tubular shaft provided inwardly of its ground-penetrating end with an abutment for limiting the depth to which the projectile penetrates the ground, and automatic means for firing said guns to discharge the said projectiles successively and at predetermined intervals while the airplane is in motion.

5. A rack composed of horizontal upper and lower shelf-like flanges on one side of and at relatively opposite edges of a thin plate-like body, the upper flange having a row of longitudinally spaced screw threaded openings and the lower flange having non-threaded openings in axial alignment with corresponding screw threaded openings of the upper flange, a plurality of tubes screwed at their upper ends into the openings on the upper flange and depending at their lower ends through corresponding openings in the lower flange, a screw cap on the upper end of each tube, a cartridge in each tube having a supporting flange at its detonator end adapted to rest upon the upper edge of the tube and to be clamped to the latter by the said screw cap, the latter having a central opening through which the detonator end of the cartridge is exposed.

6. In a device of the character described, a gun barrel consisting of a tube and a breech cap having a central opening; a cartridge consisting of a tubular shell having a snug fit in the bore of the tube and a cartridge cap screwed over the rear end of the shell, said cartridge cap having a supporting flange extending between the edge of the gun tube and the breech cap to be clamped to the tube when the said cap is screwed down thereon, a spark plug screwed in said cartridge cap and extending outwardly of the gun tube through the central opening in the breech cap; a dart projectile in said cartridge shell consisting of a slender shaft having an inner feathered end and an outer headed end in frictional sustaining contact with the internal wall of the shell; and a wadding and an explosive charge at the inner end of the projectile.

7. A dart comprising a slender shaft having a feathered end and a target-penetrating end, and an abutment-forming member fixed on the said shaft in slightly set back relation to the target-penetrating end of the shaft and extending laterally of the shaft for contacting the target to limit the depth to which the dart may penetrate the target.

8. A dart comprising a slender tube feathered at one end and chamfered at the other end for penetrating a target, and an abutment forming member fixed on the said tube and extending around the latter in slightly set back relation to the chamfered end of the tube for contacting the target to limit the depth to which the dart may penetrate the target.

9. A dart comprising a slender shaft having a feathered end and a target-penetrating end, and a hemispherical head fixed on the said shaft in slightly set back relation to the target-penetrating end of the shaft and with its rounded surface forwardly disposed for contacting the target to limit the depth to which the dart may penetrate the target.

10. A dart having a slender shaft feathered at one end, a pair of relatively spaced washers encircling the shaft adjacent the opposite end of the latter, the trailing washer being rigidly connected with the said shaft and the leading washer being releasedly connected with the shaft for removal therefrom, and a removable head having a centrally apertured body embracing the shaft and secured thereto by and between the said washers.

11. A dart having a slender shaft provided with a feathered end and a target-penetrating end, a pair of relatively spaced washers mounted on the said shaft in set back relation to the target-penetrating end of the shaft, the washer farthest removed from the said target-penetrating end of the shaft being welded to the shaft and the other washer being fastened to the shaft with a cotter, and a head mounted on the shaft and held in fixed position thereon by and between the said washers to provide an abutment for contacting the target to limit the depth to which the dart may penetrate the target.

12. In a cartridge, a cartridge shell containing an explosive charge and a projectile, the said projectile consisting of a hemispherical head disposed outwardly of the shell with its flat faced side disposed against the forward edge of the shell and provided with a reduced portion having a tight friction fit in the forward end of the shell, a slender shaft fixed at its outer end to the said head and extending inwardly and centrally of the said shell from a point externally beyond the said head and shell, and a plurality of fins integral with the inner end of the shaft and extending radially therefrom into frictional contact with the surrounding wall of the shell.

13. The method of ascertaining the velocity of a moving vehicle relative to the surface passed over which consists in marking the surface at known constant time intervals and at places thereon corresponding to instantaneous locations of the vehicle at the time of the marking to establish fixed points representing successive distances passed over by the vehicle in known equal units of time, and then measuring the distances between the fixed points to evaluate the distance factor D in the equation $V=D/T$, where T represents the time and V represents the velocity.

14. A device for use in ascertaining the landing speed of an airplane which comprises the combination with the airplane of a plurality of releasable objects carried by the airplane and adapted when released to fall to the ground and to remain fixed relative thereto as reference points for measuring purposes, normally inactive automatic mechanism operable for releasing the said objects singly and at known constant time intervals, and means mounted on the airplane for contacting the ground shortly prior to the instant of landing and responsive to such contact for initiating the operation of the releasing mechanism.

THEOPHILE DE PORT.